(12) United States Patent
Bales et al.

(10) Patent No.: US 7,698,655 B2
(45) Date of Patent: Apr. 13, 2010

(54) PORTAL BRANDING

(75) Inventors: Christopher E. Bales, Boulder, CO (US); Jeffrey Mueller, Superior, CO (US)

(73) Assignee: BEA Systems, Inc., Redwood Shores, CA (US)

( * ) Notice: Subject to any disclaimer, the term of this patent is extended or adjusted under 35 U.S.C. 154(b) by 400 days.

(21) Appl. No.: 11/130,517

(22) Filed: May 17, 2005

(65) Prior Publication Data

US 2005/0273501 A1 Dec. 8, 2005

Related U.S. Application Data

(60) Provisional application No. 60/573,047, filed on May 21, 2004.

(51) Int. Cl.
G06F 3/048 (2006.01)

(52) U.S. Cl. .................. 715/810; 715/809; 715/862; 715/708; 715/711; 715/731; 715/742; 715/762; 715/808

(58) Field of Classification Search .......... 715/527, 715/808–810, 812, 862, 705, 708, 711, 731, 715/742, 762; 707/102; 709/217, 219; 717/100, 717/103, 121, 125
See application file for complete search history.

(56) References Cited

U.S. PATENT DOCUMENTS 6,327,628 B1 *  12/2001  Anuff et al. ................. 719/311

| 2003/0014442 | A1 * | 1/2003 | Shiigi et al. | 707/513 |
| 2003/0025730 | A1 * | 2/2003 | Brennan | 345/760 |
| 2004/0046789 | A1 * | 3/2004 | Inanoria | 345/748 |
| 2004/0123238 | A1 * | 6/2004 | Hefetz et al. | 715/513 |
| 2004/0148307 | A1 * | 7/2004 | Rempell | 707/102 |
| 2004/0158602 | A1 * | 8/2004 | Broberg | 709/200 |
| 2004/0183831 | A1 * | 9/2004 | Ritchy et al. | 345/762 |
| 2004/0250204 | A1 * | 12/2004 | Isaacson | 715/517 |
| 2005/0108648 | A1 * | 5/2005 | Olander et al. | 715/744 |
| 2005/0108732 | A1 * | 5/2005 | Musson et al. | 719/328 |
| 2005/0262480 | A1 * | 11/2005 | Pik et al. | 717/120 |

OTHER PUBLICATIONS

Defined. (n.d.). The American Heritage® Dictionary of the English Language, Fourth Edition. Retrieved Jan. 11, 2008, from Dictionary.com website: http://dictionary.reference.com/browse/defined.*

Copy. (n.d.). Dictionary.com Unabridged (v 1.1). Retrieved Jan. 11, 2008, from Dictionary.com website: http://dictionary.reference.com/browse/copy.*

Java Archive. (n.d). Free On-line Dictionary of Computing. Retrieved Jan. 11, 2008 from Foldoc.org website: http://foldoc.org/?query=JAR.*

\* cited by examiner

Primary Examiner—Weilun Lo
Assistant Examiner—Rashedul Hassan
(74) Attorney, Agent, or Firm—Fliesler Meyer LLP

(57) ABSTRACT

A preview tool for a portal can include a portal display produced from style information for the portal and a palette. The palette indicates style information related to curser positions. The style information can be a Cascading Style Sheet class.

12 Claims, 4 Drawing Sheets

PORTAL BRANDING

CLAIM OF PRIORITY

This application claims priority to U.S. Provisional Application No. 60/573,047 entitled "Portal Branding" filed May 21, 2004.

FIELD OF THE INVENTION

The present invention is directed to portal technology.

BACKGROUND

Portals can provide access to information networks and/or sets of services through the World Wide Web and other computer networks. Portals can provide a single point of access to data and applications, making them valuable to developers, businesses, and consumers alike. A portal can present a unified and personalized view of enterprise information to employees, customers, and business partners. In many implementations, portal applications can include web application views designed as a portal.

Portals are capable of presenting multiple web application views within a single web interface. In addition to regular web content that can appear in a portal, portals provide the ability to display portlets (self-contained applications or content) in a single web interface. Portals can also support multiple pages with menu-based or custom navigation for accessing the individualized content and portlets for each page.

A working portal can be defined by a portal configuration. The portal configuration can include a portal definition such as a file including Extensible Markup Language (XML); portlet definition files for any portlets associated with the portal; java server pages (JSPs); web application descriptors; images such as graphics interchange format files (GIFs); deployment descriptors, configuration files, the java archive (JAR) files that contain the logic and formatting instructions for the portal application; and any other files necessary for the desired portal application.

DETAILED DESCRIPTION

Portals can provide access to information networks and/or sets of services through the World Wide Web (WWW) or other computer networks. These networks can range from broad interconnections of computing systems such as the Internet to localized area networks including a few computers located in close geographic proximity such as a home or office. Portal applications can include web application views designed as a portal.

Portlets can be implemented as java server pages (JSPs) referenced by XML-based metadata of the portal descriptor. Portlets can utilize various types of display code to display highly focused information directed to a specific user or user group, having a portal as its container. Portlets can be comprised of portlet components which include portlet attributes (i.e. whether the portlet is editable, floatable, minimizable, maximizable, helpable, mandatory, has defaults minimized, or whether login is required) and portlet layout elements or components (i.e. banner, header, content, and footer sections). In one embodiment, a portlet is defined by a file that contains a portlet's XML-based metadata, which is created and edited by an integrated design environment or administration tool. Portlets can also be associated with portlet resource files including skeleton JSPs (one for each portlet layout element) and image files saved to a local file system by a portal designer of integrated design environment.

Figure 1:
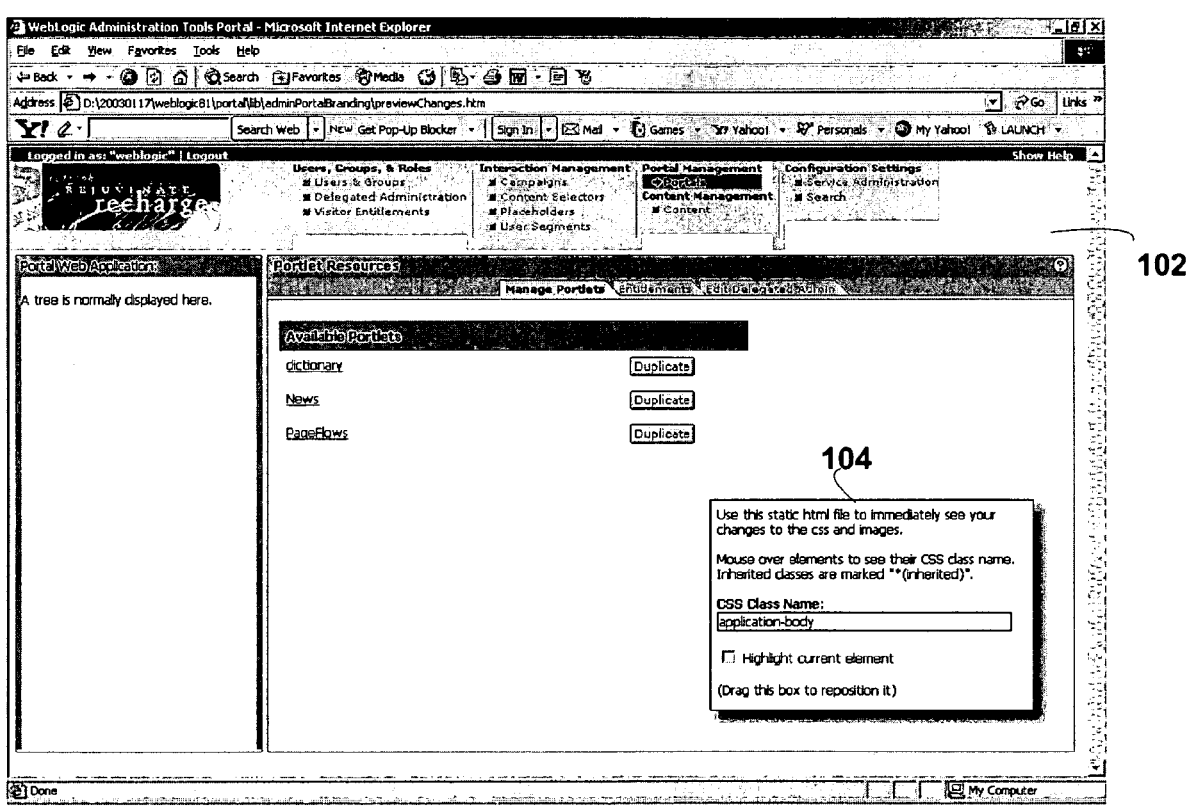
FIG. 1 illustrates a preview tool of one embodiment of the present invention.

FIG. 1 shows a preview tool 100 for a portal of one embodiment of the present invention. The preview tool 100 includes a preview display 102 constructed from local copy of style information for a portal. The style information can be in cascading style sheet (CSS) format or other format. The preview display 102 can be produced with an HTML grab of a portal. The preview tool 100 can include a palette 104 that indicates style information corresponding to a curser position. The palette 104 can be a menu, window or other display.

The preview tool can be produced from javascript and HTML accessable at a URL. The palette 104 can also be used to select whether to highlight the current style element which the curser is positioned over. The highlighting can be done by blinking the element a different color or in some other fashion. The highlighting shows the user the size and location of the element.

In one embodiment, the style element includes color, font type, font size, or other style information. In one embodiment, the style information for the preview tool can be downloaded to the user's browser. The palette can operate in javascript so that the operations of the preview tool will not require significant interactions with the server after downloading the HTML and javascript. Changes to the style information can be done at the style information at the local at the browser.

Figure 2:
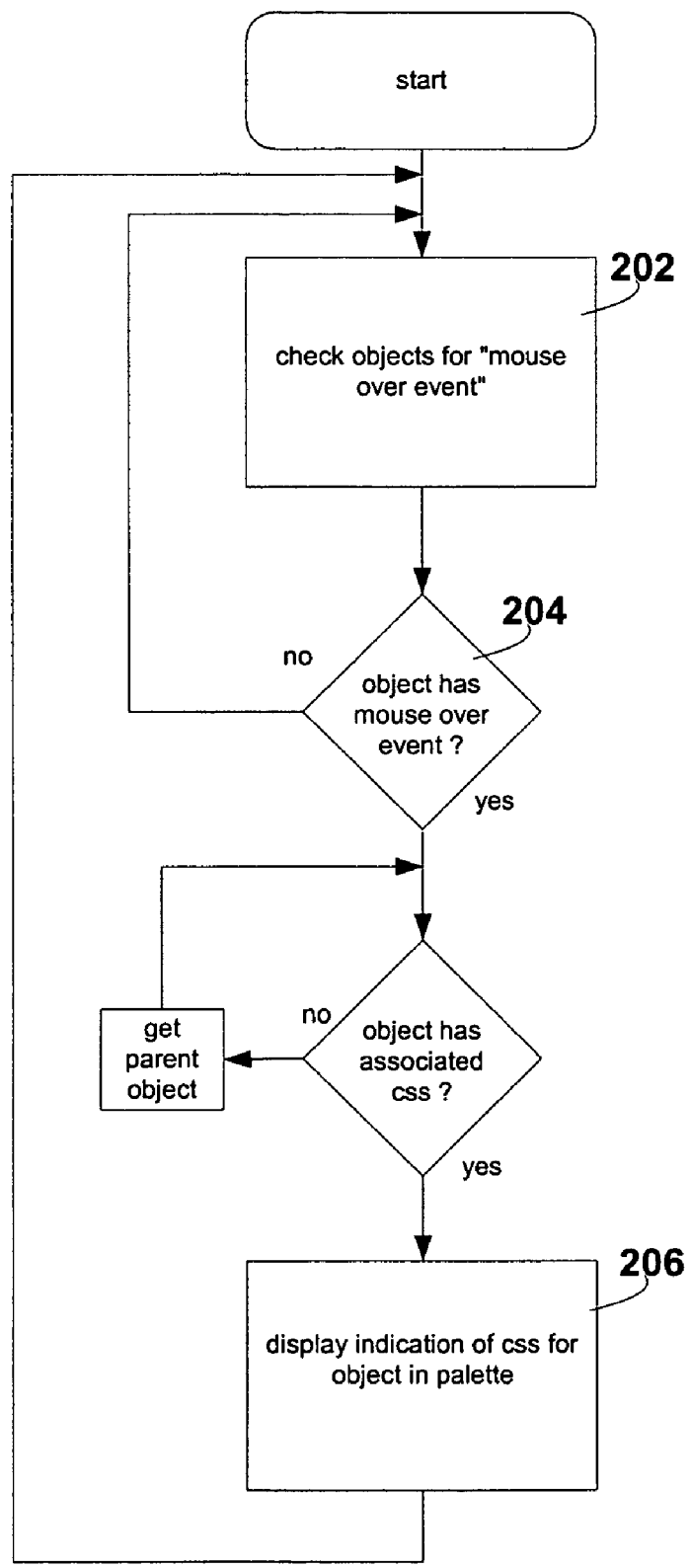
FIG. 2 illustrates a flow chart of one embodiment of the present invention.

FIG. 2 illustrates the operation of the palette of one embodiment. In step 202, the objects of a page are checked for "mouse over" events. An object with a "mouse over" event can be checked for associated style information. In one embodiment, an object is checked for an associated CSS class, in step 204. If the object does not have an associated CSS class, parent objects are checked until a CSS class is found. An indication of the relevant CSS class can be displayed, in step 206. The palette can also indicate whether the CSS class is inherited.

Figure 3:
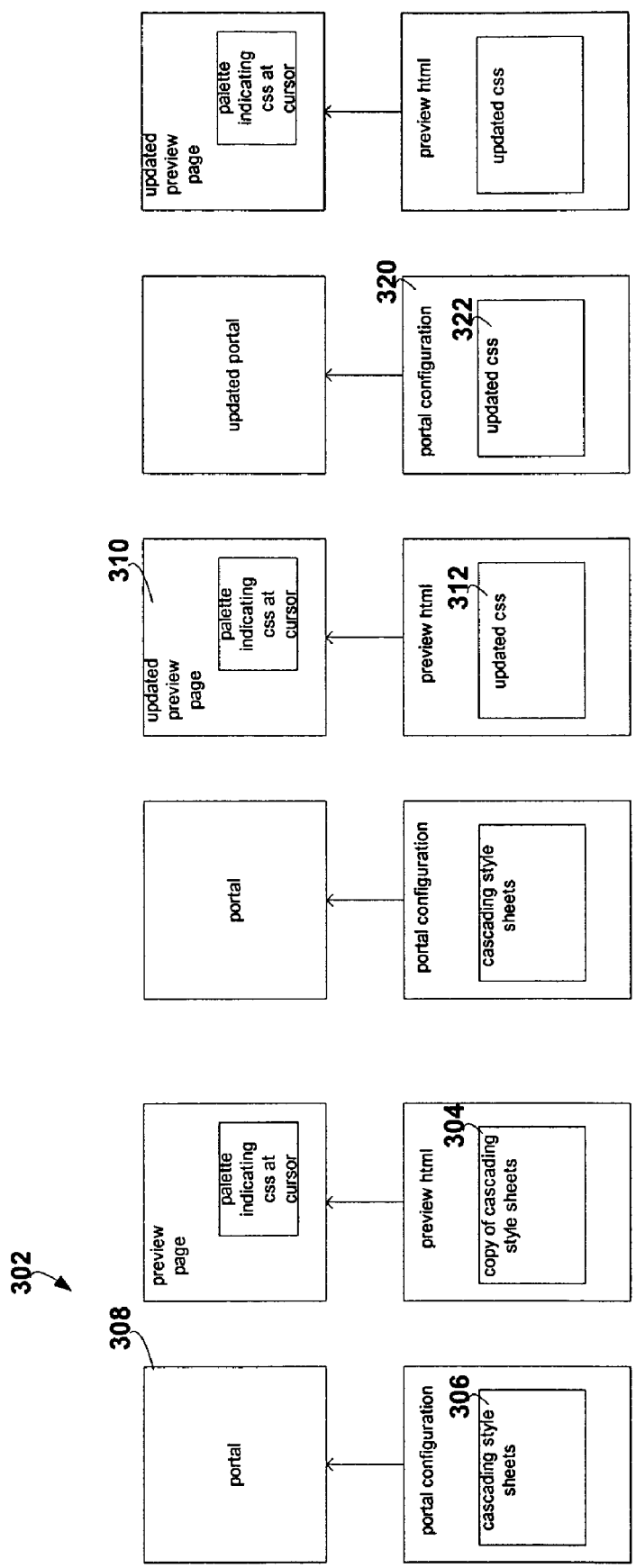
FIGS. 3A-3C are diagrams that illustrate the operation of one embodiment of the present invention.

The portal can be an administration tool or some other type of portal. One embodiment of a method of the present invention is shown in FIGS. 3A-3C. A preview tool 302 is displayed from style information 304 for a portal 308. The style information 304 can be a copy of style information 306 of the portal as shown in FIG. 3A, the display 310 of the preview tool is modified by the update 312 of the style information. The style information can be modified manually or with an automated tool. In one embodiment, a JAR command is used to update the style information. A user can then view the modified display to see the effects of the changes to the style information. As shown in FIG. 3C, the configuration 320 of the portal can be updated with the updated style information 322.

In one embodiment, the style information is cascading style sheets (CSS). The preview tool can include a preview display and a palette that indicates style information corresponding to a curser position. The portal can be an admin tool.

Figure 4:
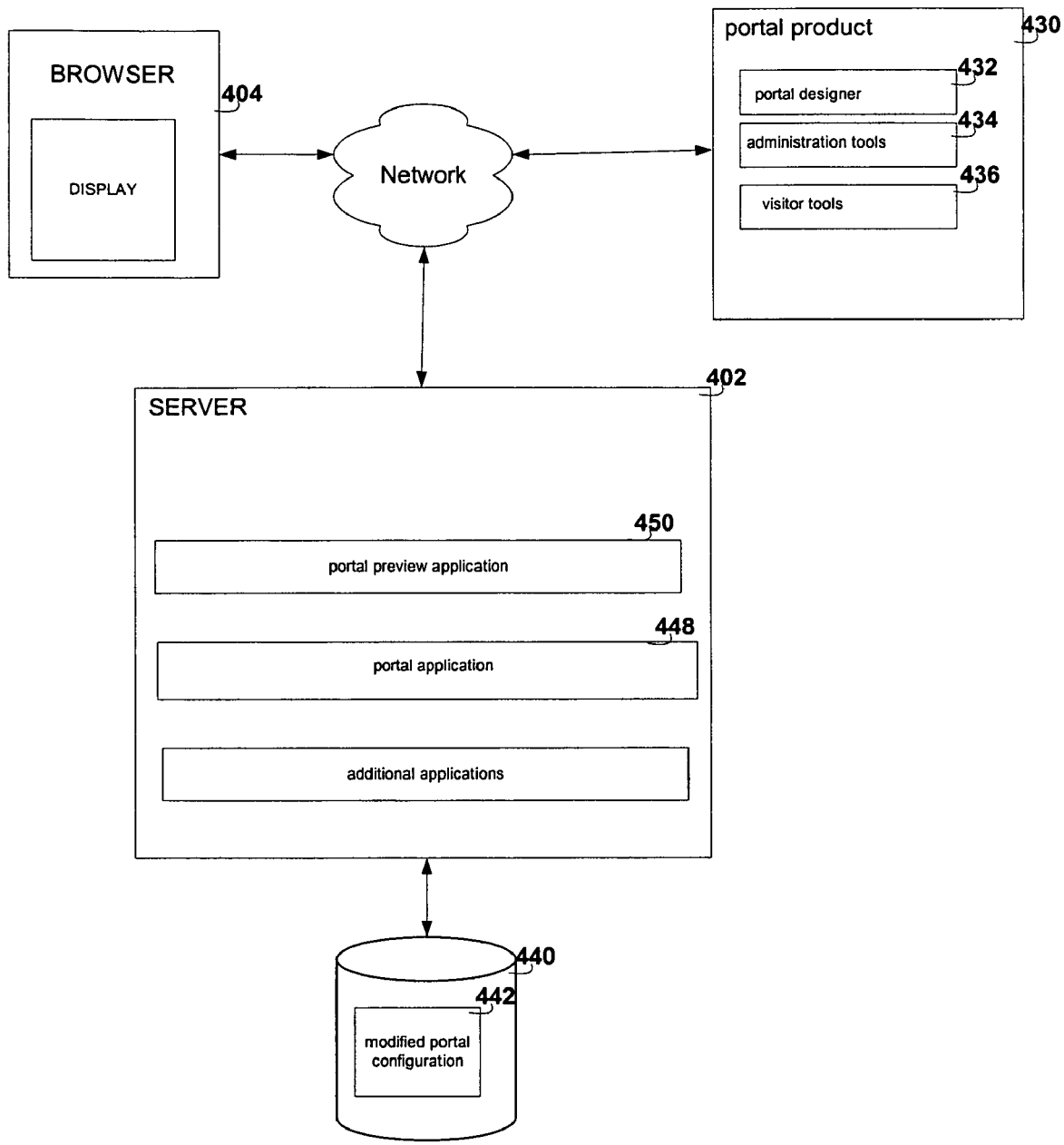
FIG. 4 is a diagram that illustrates a system of one embodiment of the present invention.

FIG. 4 illustrates a system for implementing one embodiment of the present invention. Server 402 can be used to produce the portal for display at the browser 404. In one embodiment, the server 402 produces a portal display in response to a request from the browser client 404. The portal can be configured for different users and different group of users, where different portlets can be displayed based upon a user's group or role. The server 402 can use a portal configuration including style information.

The browser 404 can also produce a display of the portal preview application 450. The portal preview application 450 can be static HTML along with the javascript for the palette display. The portal preview application 450 can also use tools to modify the style information. The server 402 can be software that can be run on one or more server machines. In one embodiment, the server 402 is a WebLogic Server™ available BEA Systems Inc., of San Jose, Calif.

A portal product 430 can be an Integrated Design Environment (IDE) for producing the portal. In one embodiment, the IDE includes a portal designer 432 for the design of the portal, portlets and other portal elements. The administration tools 434 and visitor tools 436 are used for producing versions of the portal. In one embodiment, the different versions uses the portal configuration to produce a modified portal configuration 442 that can be stored in a database 440. Portals can be produced from the database 440, a cache or directly from the portal configuration.

The system of the present invention can be used for portal branding. A main portal stored in an archive file can have its style information updated. In addition to style information, changes and updates to icons and other display information can be made.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a storage medium (media) having instructions stored thereon/in which can be used to program a computer to perform any of the features presented herein. The storage medium can include, but is not limited to, any type of disk including floppy disks, optical discs, DVD, CD-ROMs, micro drive, and magneto-optical disks, ROMs, Rams, EPROM's, EPROM's, Drams, Rams, flash memory devices, magnetic or optical cards, Nanoscale systems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, execution environments/containers, and user applications.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps performed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

What is claimed is:

1. A preview tool for a portal implemented using a computer, the preview tool comprising:

one or more microprocessors;

a portal, located on a server, defined by a portal configuration, wherein the portal contains a plurality of portlets that utilize various types of display code to display focused information directed to a specific user or user group and each of the plurality of portlets is a self-contained application and is defined by a particular portlet configuration file in a plurality of portlet configuration files that contains meta-data that is created and edited by an integrated design environment or administration tool for that portlet, wherein the portal configuration includes style information to define a portal display of the one or more portlets;

a portal preview application, running on the one or more microprocessors, that operates to modify the style information of the portal, wherein the portal preview application is associated with a preview display of the portal, wherein the preview display of the portal is constructed from a local copy of the style information that defines the preview display at a browser, wherein the local copy of the style information is separate from the style information in the portal configuration, and wherein the preview display of the portal is associated with a palette that indicates the style information corresponding to a curser position within the preview display defined in the local copy of the style information, and wherein the palette can be downloaded to the browser from the server to avoid significant interactions between the browser and the server during the operations of the preview tool, wherein the style information is in cascading style sheet (CSS) format and wherein the palette displays a CSS class and whether the CSS class is inherited, wherein the preview display for each one of the plurality of portlets is updated once a local copy of the particular portlet configuration file that contains style information for the particular portlet is changed, and the change in the local copy of the particular portlet configuration file operates to be applied to the style information in the portal configuration that updates the portal display of the plurality of portlets.

2. The preview tool of claim 1, wherein the preview tool checks objects for mouse over events.

3. The preview tool of claim 2, wherein objects with "mouse over" events are checked for an associated CSS class.

4. The preview tool of claim 3, wherein if objects with "mouse over" events do not have an associated CSS class, the parent of the object is checked for an associated CSS class.

5. The preview tool of claim 1, wherein the modified local copy of the style information is moved to the portal configuration.

6. The preview tool of claim 1, wherein the portal is an admin tool.

7. The preview tool of claim 1, wherein the portal preview application is a separate application from the portal, and the portal preview application allows different versions of the portal with different portal configurations to be produced and displayed.

8. The preview tool of claim 1, wherein each of the plurality of portlets is associated with one or more portlet resource files, and wherein the portal preview application maintains local copies of one or more portlet resource files for each of the plurality of portlets.

9. A method comprising:

defining a portal by a portal configuration, wherein the portal contains a plurality of portlets that utilize various types of display code to display focused information directed to a specific user or user group and each of the plurality of portlets is a self-contained application and is defined by a particular portlet configuration file in a plurality of portlet configuration files that contains meta-data that is created and edited by an integrated design environment or administration tool for that portlet;

displaying a preview tool of the portal based on a portal preview application that operates to modify the style information of the portal, wherein the portal preview application is associated with a preview display of the portal, wherein the preview display of the portal is constructed from a local copy of the style information that defines the preview display at a browser, wherein the local copy of the style information is separate from the style information in the portal configuration, and wherein the preview display of the portal is associated with a palette that indicates the style information corresponding to a curser position within the preview display defined in the local copy of the style information, and wherein the palette can be downloaded to the browser from the server to avoid significant interactions between the browser and server during the operations of the preview tool, wherein the style information is in cascading style sheet (CSS) format and wherein the palette displays a CSS class and whether the CSS class is inherited;

updating the preview display for each one of the plurality of portlets once a local copy of the particular portlet configuration file that contains style information for the particular portlet is changed, and the change in the local copy of the particular portlet configuration file operates to be applied to the style information in the portal configuration that updates the portal display of the plurality of portlets; and updating the configuration of the portal with the updated style information.

10. The method of claim 9, wherein the preview tool includes preview display.

11. The method of claim 9, wherein the preview tool includes a palette that indicates style information corresponding to a curser position.

12. A machine readable storage medium having instructions stored thereon that when executed by a processor cause a system to:

define a portal by a portal configuration, wherein the portal contains a plurality of portlets that utilize various types of display code to display focused information directed to a specific user or user group and each of the plurality of ortlets is a self-contained a lication and is defined by a particular portlet configuration file in a plurality of portlet configuration files that contains meta-data that is created and edited by an integrated design environment or administration tool for that portlet;

display a preview tool of the portal based on a portal preview application that operates to modify the style information of the portal, wherein the portal preview application is associated with a preview display of the portal, wherein the preview display of the portal is constructed from a local copy of the style information that defines the preview display at a browser, wherein the local copy of the style information is separate from the style information in the portal configuration, and wherein the preview display of the portal is associated with a palette that indicates the style information corresponding to a curser position within the preview display defined in the local copy of the style information, and wherein the palette can be downloaded to the browser from the server to avoid significant interactions between the browser and server during the operations of the preview tool, wherein the style information is in cascading style sheet (CSS) format and wherein the palette displays a CSS class and whether the CSS class is inherited;

update the preview display for each one of the plurality of portlets once a local copy of the particular portlet configuration file that contains style information for the particular portlet is changed, and the change in the local copy of the particular portlet configuration file operates to be applied to the style information in the portal configuration that updates the portal display of the plurality of portlets; and update the configuration of the portal with the updated style information.

* * * * *

UNITED STATES PATENT AND TRADEMARK OFFICE
CERTIFICATE OF CORRECTION

| | | |
|---|---|---|
| PATENT NO. | : 7,698,655 B2 | Page 1 of 1 |
| APPLICATION NO. | : 11/130517 | |
| DATED | : April 13, 2010 | |
| INVENTOR(S) | : Bales et al. | |

It is certified that error appears in the above-identified patent and that said Letters Patent is hereby corrected as shown below:

In column 2, line 23, delete "accessable" and insert -- accessible --, therefor.

In column 6, line 13, in Claim 12, delete "ortlets" and insert -- portlets --, therefor.

In column 6, line 13, in Claim 12, delete "a lication" and insert -- application --, therefor.

Signed and Sealed this
Eighth Day of March, 2011

David J. Kappos
*Director of the United States Patent and Trademark Office*